United States Patent [19]
Ward

[11] Patent Number: 5,288,124
[45] Date of Patent: Feb. 22, 1994

[54] SPECIALTY-TRUCK CONVERSION VAN WITH A LINER INSERT

[76] Inventor: Jeffrey Ward, 3320 Wall Blvd. 11-102, Gretna, La. 20056

[21] Appl. No.: 959,787

[22] Filed: Oct. 13, 1992

[51] Int. Cl.$^5$ .............. B60P 9/00; B60R 27/00
[52] U.S. Cl. ..................... 296/183; 296/39.2
[58] Field of Search ............ 296/183, 39.1, 39.2, 296/10

[56] References Cited

U.S. PATENT DOCUMENTS

| | | | |
|---|---|---|---|
| Re. 32,198 | 7/1986 | Wayne | 296/39.2 |
| 1,857,796 | 5/1932 | Styslinger | 296/183 |
| 2,530,097 | 11/1950 | Troth | 296/183 X |
| 2,591,380 | 4/1952 | Schreiner | 296/183 |
| 3,741,605 | 6/1973 | Lee | 296/10 |
| 3,881,768 | 5/1975 | Nix | 296/32.2 |
| 4,061,394 | 12/1977 | Vodin | 296/100 |
| 4,569,554 | 2/1986 | Dodgen | 296/183 X |
| 4,613,183 | 9/1986 | Kesling | 296/183 |
| 4,738,480 | 4/1988 | Ward | 296/37.6 X |
| 4,765,671 | 8/1988 | Allen | 296/39.2 |
| 4,875,731 | 10/1989 | Ruiz | 296/39.2 X |
| 4,941,702 | 7/1990 | Southward | 296/37.15 X |
| 5,154,478 | 10/1992 | Erickson et al. | 296/39.2 |

FOREIGN PATENT DOCUMENTS 2520309  7/1983  France ................ 296/100

OTHER PUBLICATIONS

Autobody, Jan. 1928, p. 24.
Automotive Magazine, Feb. 6, 1984, p. 78.

*Primary Examiner*—Joseph D. Pape
*Attorney, Agent, or Firm*—Milton S. Gerstein

[57] ABSTRACT

A method of producing a truck-like conversion van starts with a conventional, cargo van, and vertical section of the main frame of the vehicle, just rearwardly of the side doors of the van. Thereafter, a horizontal cut is made starting from the bottom of the vertical cut and progressing rearwardly all the way through the frame or existing floor of the van. Thus, a rectangular-shaped slab or cutout of the conventional van is removed. The horizontal plane in which the horizontal cut is made is above the top of the rear tail lights, so that, not only are all of the mechanical parts of the original van retained, but also the same, original tail lights are also retained. After the slab has been cut away and removed, a truck-bed liner-insert of the invention is inserted into the cut-away, rear portion of the van, which rear portion is partially hollow, by which the liner-insert may be received therein. The truck-bed liner-insert is shaped in order to simulate the bed of a conventional pick-up truck, whereby the conversion van may now take the shape of a specialty truck-conversion van having a rear truck-bed for storage and transport.

7 Claims, 3 Drawing Sheets

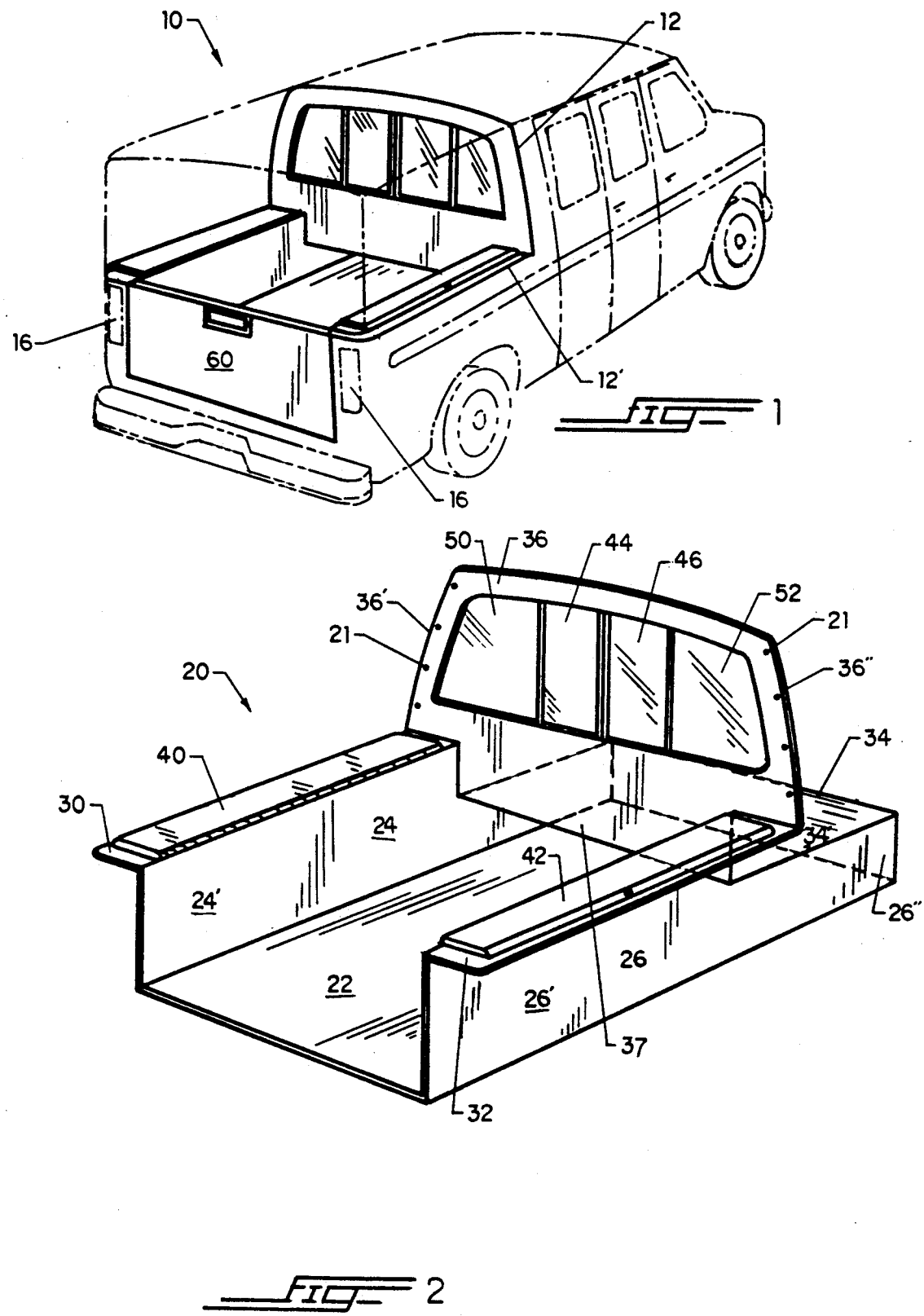

SPECIALTY-TRUCK CONVERSION VAN WITH A LINER INSERT

BACKGROUND OF THE INVENTION

The present invention is directed to a conversion van in the form of a pick-up truck-like vehicle. Such a vehicle is presently produced by Centurion Vehicles, Inc., of White Pigeon, Michigan. This prior-art, truck-like conversion van is produced by starting with a conventional cargo van or the like, and vertically, completely cutting that conventional van into two separate halves: A forward half-section, and a rear half-section. The vertical cut is made just rearwardly of the side doors of the van. The front section is retained, and the rear section is discarded, or recycled for other uses. Thereafter, a new rear section is welded to the front section, which new rear section is in the form of a pick-up truck bed.

SUMMARY OF THE INVENTION

It is the primary objective of the present invention to provide a conversion van in the form of a pick-up truck-like vehicle which is produced in a manner that retains more of the original van than that of the prior-art conversion van, thus reducing costs and labor time.

It is another objective of the present invention to provide such a conversion van having a rear truck-bed that utilizes the same main frame and tail lights of the original van.

Toward these and other ends, the method of the invention for producing a truck-like conversion van starts with a conventional, cargo van, or the like, and vertically cuts that conventional van only partially along a vertical section of the main frame of the vehicle, just rearwardly of the side doors of the van. Thereafter, a horizontal cut is made starting from the bottom of the vertical cut and progressing rearwardly all the way through the frame of the van. Thus, a rectangular-shaped slab or cutout of the conventional van is removed. The horizontal plane in which the horizontal cut is made is above the top of the rear tail lights, so that, not only are all of the mechanical parts of the original van retained, such as wheels, brakes, etc., but also the same, original tail lights are also retained. The rectangularly-shaped slap, or cutout, may be discarded, recycled for other uses, or, according to the preferred embodiment of the invention, may be re-used to cover the truckbed of the conversion van. To allow for such re-covering of the bed, the original slab is fitted with conventional clamps for securing the slab onto the rim of the rear of the van. After the slab has been cut away and removed, a truck-bed liner-insert of the invention is inserted into the cut-away, rear portion of the van, which rear portion is partially hollow, by which the liner-insert may be received therein. The truck-bed liner-insert is preferably made of fiberglass, and is shaped in order to simulate the bed of a conventional pick-up truck, whereby the conversion van may now take shape of a specialty truck-conversion van having a rear truck-bed for storage and transport.

BRIEF DESCRIPTION OF THE DRAWINGS

FIG. 1 is a perspective view of the specialty truck-conversion van of the invention after a conventional van has been cut according to the method of the invention;

FIG. 2 is a perspective view of the truck-bed liner-insert that is inserted into a conventional van after it has been cut according to the method of the invention;

DETAILED DESCRIPTION OF THE INVENTION

Figure 3:
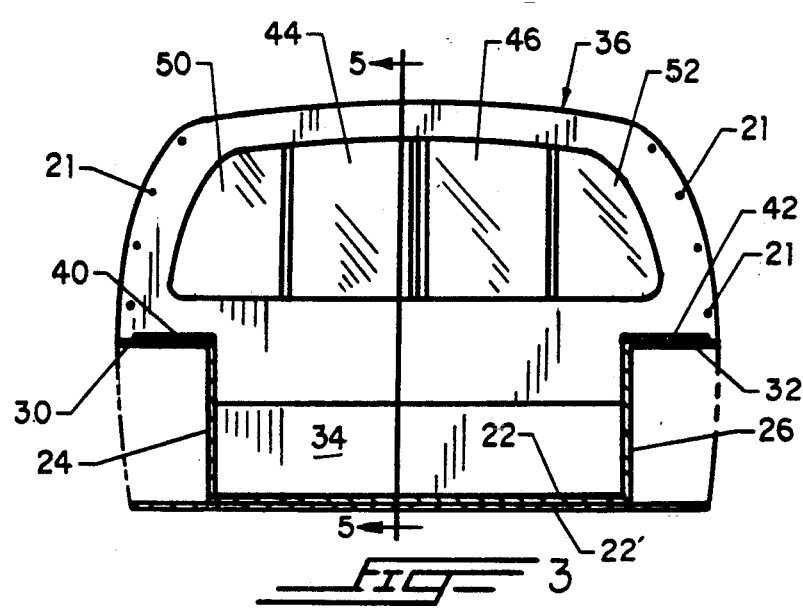
FIG. 3 is a rear view, in partial cross section, of the truck-bed liner-insert of FIG. 2.
Figure 4:
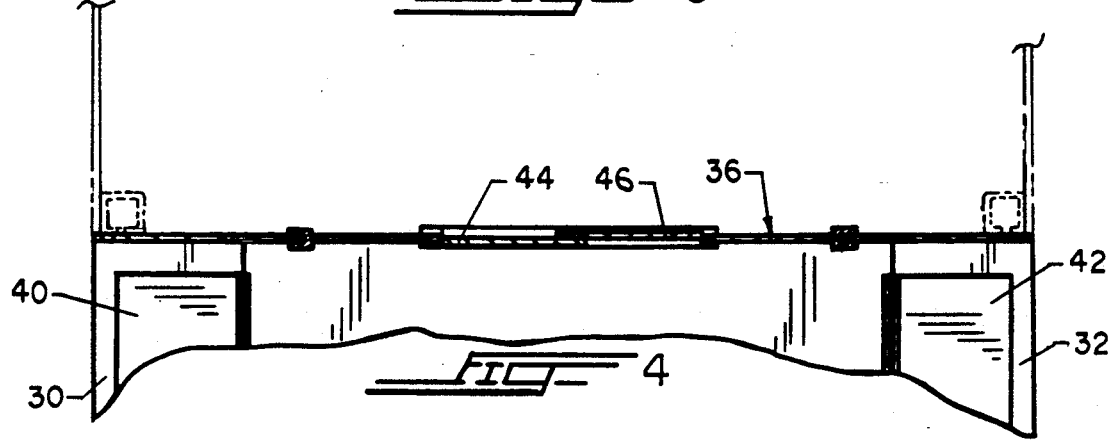
FIG. 4 is a top view in partial cross section, of the truck-bed liner-insert of FIG. 2.
Figure 5:
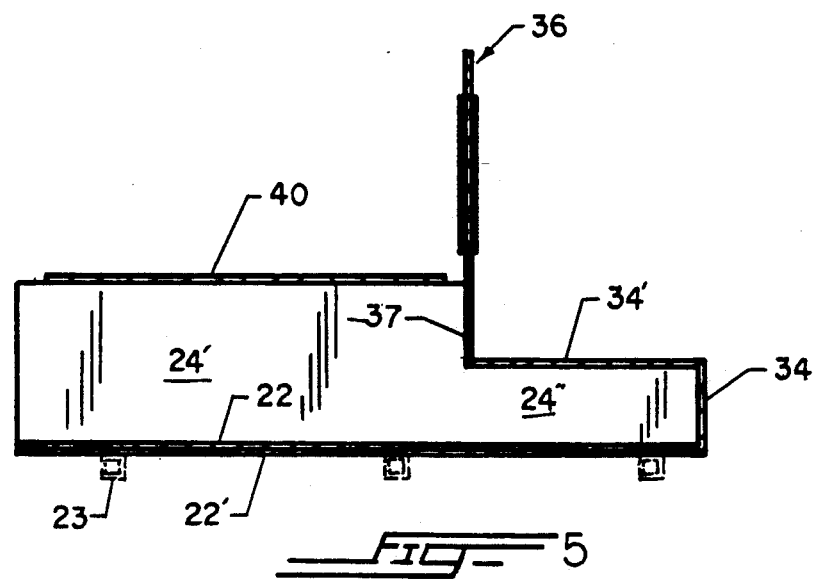
FIG. 5 is a cross-sectional view taken along line 5—5 of FIG. 3.

Referring now to the drawing in greater detail, the specialty truck-conversion van of the invention is indicated generally by reference numeral 10. According to the method of producing the specialty truck-conversion van 10, an original, conventional van, such as cargo van, is provided, as shown in dotted lines in FIG. 1. This conventional van is partially, vertically cut starting from the roof downwardly, just rearwardly of the side doors, at a location indicated by reference numeral 12. The vertical cut progresses for about half of the vertical height of the van, to a horizontal plane that lies slightly above the top of the tail lights 16. Thereafter, starting from the bottom of the vertical cut that was made, a rearwardly-directed horizontal cut is made all the way to and through the rear end of the van, just above the two tail lights, until an entire, rectangular-shaped slab-section or cutout is cut away and removed from the van, thus exposing a partially-hollow well, or interior volume, above the drive axle, wheels, etc. The hollow well has exposed therein the transverse support beams of the frame proper of the original, conventional van, with the wheels, axle, brakes, and the like, being positioned therebelow.

After an original, conventional van has been cut as above-described, a one-piece, integrally-formed truck-bed liner-insert 20, as shown in FIGS. 2-5, is then inserted into the rear, exposed, hollow well. The truck-bed liner-insert 20 has a lower, supporting floor-section 22, a pair of vertical side walls 24, 26, a pair of overhangs, or mounting flanges, 30, 32, a front wall 34, and an intermediate, vertical window-section 36. The width of the liner-insert, as measured between the outer surfaces of the two side walls 24, 26, is less than the width of the hollow well of the cut-away van's rear section, so that the liner-insert may be received, or dropped, within the well, with the supporting floor-section 22 being supported on a board or platform 22' (see in FIGS. 3 and 5), which platform 22' is placed directly on the transverse frame-beams 23 or existing van floor seen in FIG. 5. The overhangs 30, 32 overhang exposed, upper edge-surfaces or rim of the portion of the rear frame of the conventional frame which had been cut, as above-described. Each overhang section 30, 32 is provided with a rectangular-shaped opening extending most of the length, which opening is covered by hinged covers 40, 42. These covers 40, 42 are used for accessing the side-volumes directly below the overhangs 30, 32, which side volumes are bounded by a respective side wall 24, 26, a respective outside surface of the van proper juxtapositioned opposite to the respective side wall 24, 26, and, on the bottom, by a plank or board placed on the transverse beams 23, which may be the same board, or platform, 22'. These side-volumes define wheel-storage spaces for tools, or just for extra storage space. Each of the side walls 24, 26 has a rear section 24', 26' that is of greater height than the forward section 24", 26".

The window-section 36 is located at the forward-end edge-surfaces of the overhangs 30, 32, between the two sections of the side walls, and has a width and height that closes off the opening formed when the original, conventional van was cut according to the method of the invention. The window-section 36 has a pair of sloping, curved side edges 36', 36" that conform to the general shape of the side of the original conventional van that was cut. The window-section 36 is affixed to the annular rim of the frame left remaining after the cut that was made according to the method of the invention. The window-section 36 is affixed by means of rivets, or bolts, passing through holes 21 formed in the outer edges of the window-section. A downwardly-projecting section 37 of the window-section section 36 protrudes into the interior of the liner-insert 20 at the connection of the sections 24', 26' with the respective sections 24", 26". The forward section of the liner-insert 20, defined by the lower-height forward sections 24", 26" and forward wall 34, projects into the cab-interior and under the rear bench-seat thereof, in order to provide a greater, working volume for storing and transporting articles via the truck-bed liner-insert 20, with a longer article having a forward portion extending below and past the window-section's downwardly-projecting section 37 for storage in the forward section of the liner-insert positioned under the rear bench-seat. Preferably, though not a prerequisite, the forward section under the seat may be covered with a top wall 34'. The window-section 36 is provided with a pair of conventional, slidably-movable, clear panels 44, 46 and two, fixed, clear end-panels 50, 52.

As can be seen in FIG. 1, a conventional, rear gate or door 60 is provided. The door 60 replaces the original doors of the original, conventional van that was cut, which door 60 swings out and down in a conventional manner. It is, of course, possible to modify the original pair of swing-out doors that had been cut in two by the original cut, in order to make a single door similar to the door 60.

Figure 6:
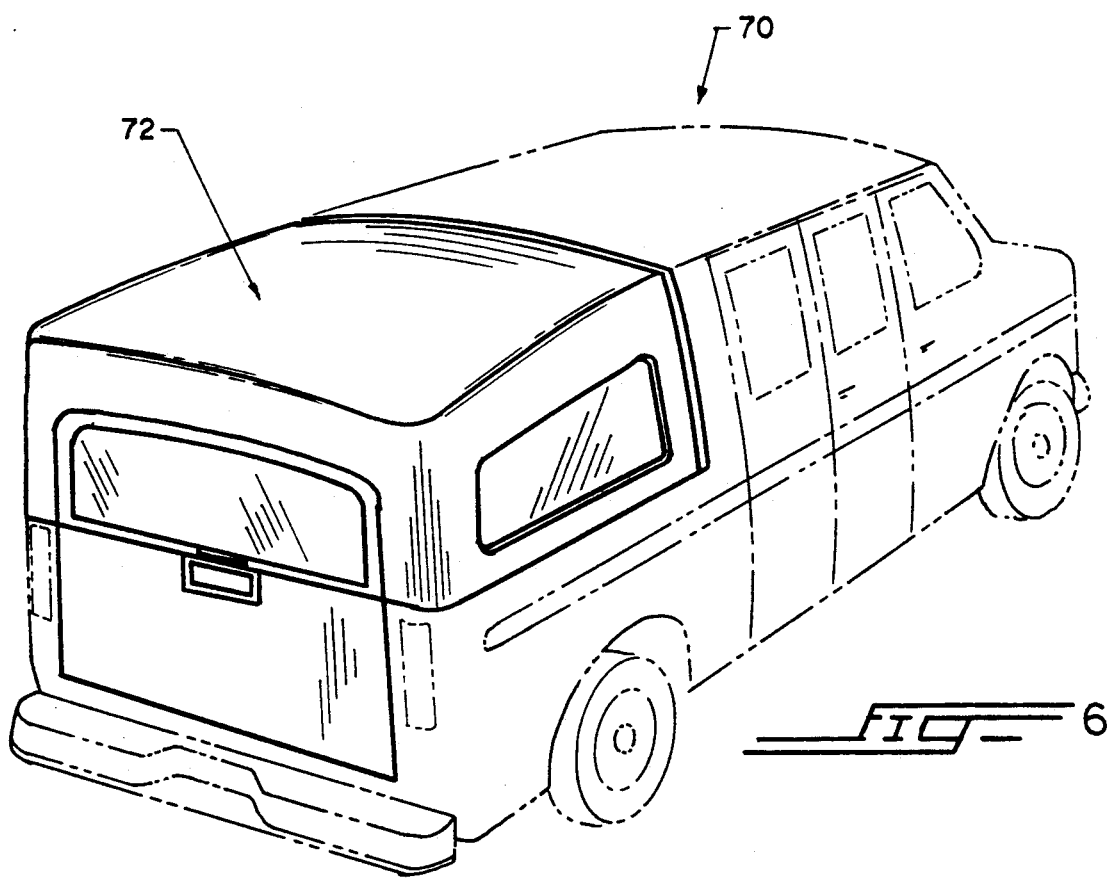
FIG. 6 is a perspective view showing a modification of the specialty truck-conversion van of the invention, in which a removable rear dome is provided, which rear dome is made from the same section of the original frame of the van that had been cut away during the method of the invention of converting a conventional van to that of a specialty truck-conversion van.

FIG. 6 shows a modification 70 in which the rear truck-bed of the van with the liner-insert therein has been covered over by a dome 72. The dome 72 is, in fact, the very same slab, or cutout, that was removed when the original, conventional van was cut. The only modification to the original slab that was cut away from the original, conventional van is that the dome, or cover, 72 is provided with conventional clamps (not shown) for removably clamping it to the upper rim 12' of the rear of the van (see FIG. 1). The dome 72, thus, acts as a protector to the storage space of the truck-bed defined by the liner-insert of the invention.

While a specific embodiment of the invention has been shown and described, it is to be understood that numerous changes and modifications may be made therein without departing from the scope, spirit and intent of the invention as set forth in the appended claims.

What I claim is:

1. A specialty truck-conversion van comprising:
   a main frame;
   a front cab-section having at least one seat and a floor;
   an upper, rear cut-out portion;
   a well-portion below said rear cut-out portion defining an upper rim;
   an existing van floor under said well-portion; and
   a liner-insert positioned in said well-portion and being supported by said existing van floor said liner-insert having overhand-members overhanging respective, oppositely-disposed portions of said upper rim of said well-portion, whereby said liner-insert forms a bed of a pick-up truck.

2. The specialty truck-conversion van according to claim 1, wherein said liner-insert further comprises:
   a bottom wall having a front edge, a rear edge, and side edges;
   a pair of side walls projecting upwardly from said bottom wall, each said side walls having an upper edge-surface, an interior-facing surface, and an exterior-facing surface;
   each of said pair of side walls comprising a first, rear section of a first height, and a second, front section of a second height less than said first height;
   said pair of overhand-members projecting away from said exterior-facing surfaces of said side walls, one said overhand-member being substantially horizontal, said overhang-members projecting away from one another; and
   a transverse window-section projecting upwardly from said side walls at the juncture of said first and second sections of said side walls, said window-section traversing across and above the width of said bottom wall, and having at least the same width as said bottom wall, whereby said window-section may close off the exposed rear of a van after it has been cut away.

3. The specialty truck-conversion van according to claim 1, further comprising a removable dome-cover for closing off said well-portion with liner-insert; said dome-cover being the slab of material removed from the van when forming said upper, rear cut-out portion.

4. A combination of a liner-insert and a specialty truck-conversion van,
   said truck-conversion van comprising a main frame, a front cab-section having at least one seat and a floor, a rear, quadrilaterally-shaped cut-out portion, and an exposed well-portion thereat defining an upper rim, and an existing van floor under said well-portion;
   said liner-insert being positioned in said well-portion and being supported by said existing van floor;
   said liner-insert comprising a bottom wall having a front edge, a rear edge, and side edges;
   a pair of side walls projecting upwardly from said bottom wall, each of said pair of side walls having an upper edge-surface;
   a pair of overhand-members projecting from at least adjacent to said upper edge-surfaces of said side walls, one said overhand-member for each said side wall; each said overhand-member being substantially horizontal, said overhand-members projecting away from one another; and
   a transverse window-section projecting upwardly from said side walls, said window-section traversing across and above the width of said bottom wall, and having at least the same width as said bottom wall;

said overhand-members overhanging respective, oppositely-disposed portions of said upper rim of said well-portion, whereby said liner-insert forms a bed of a pick-up truck.

5. The combination according to claim 4, further comprising a supporting board positioned between said bottom wall of said liner-insert and said frame-beams, whereby said liner-insert is better supported.

6. The combination claim 4, wherein said conversion van comprises a rearwardly-facing frame-rim exposed by said cut-out portion, said frame-rim projecting vertically upwardly from the forward end of said well-portion; said window-section of said liner-insert being fixedly connected to said frame-rim, whereby said window-section divides said front cab-section from said rear well-portion.

7. The combination according to claim 4, wherein said conversion van further comprises a rear door having a height approximately equal to the height of said liner-insert; said rear door being hingedly mounted to the rear end of said main frame of said conversion van, said rear door allowing access into the interior of said liner-insert.

* * * * *